United States Patent
Overcash et al.

(10) Patent No.: US 12,439,436 B1
(45) Date of Patent: Oct. 7, 2025

(54) WIRELESS CHANNEL CONTROL USING CLIENT FEEDBACK

(71) Applicant: Cox Communications, Inc., Atlanta, GA (US)

(72) Inventors: Michael Paul Overcash, Duluth, GA (US); Yousef Wasef Nijim, Cumming, GA (US); Matthew Wayne Chappell, Lawrenceville, GA (US)

(73) Assignee: Cox Communications, Inc.

( * ) Notice: Subject to any disclaimer, the term of this patent is extended or adjusted under 35 U.S.C. 154(b) by 559 days.

(21) Appl. No.: 17/748,645

(22) Filed: May 19, 2022

(51) Int. Cl.
*H04W 72/51* (2023.01)
*H04L 41/16* (2022.01)
*H04W 72/54* (2023.01)
*H04W 88/16* (2009.01)

(52) U.S. Cl.
CPC ............ *H04W 72/51* (2023.01); *H04L 41/16* (2013.01); *H04W 72/54* (2023.01); *H04W 88/16* (2013.01)

(58) Field of Classification Search
None
See application file for complete search history.

(56) References Cited

U.S. PATENT DOCUMENTS

| | | | |
|---|---|---|---|
| 2016/0066202 A1* | 3/2016 | Dayanandan | H04W 72/563 370/252 |
| 2018/0295548 A1* | 10/2018 | Kumar | H04W 36/008375 |
| 2021/0083926 A1* | 3/2021 | Costa | H04L 41/0686 |
| 2021/0235293 A1* | 7/2021 | Chen | H04B 17/318 |

* cited by examiner

*Primary Examiner* — Luna Weissberger
(74) *Attorney, Agent, or Firm* — Merchant & Gould P.C.

(57) ABSTRACT

Aspects of the present disclosure improve wireless networking performance by reducing or limiting performance issues caused by undetected or unknown interference sources and/or attenuation sources. Feedback from client devices can be utilized to reduce or limit wireless network performance issues caused by varying interference parameters and/or attenuation parameters observed by each client device. The feedback, associated with wireless communication conditions of corresponding client devices, in conjunction with a machine learning algorithm can be used to enable a dynamic selection of one or more particular operating bands, channels, and/or channel widths to avoid or limit signal interference and/or signal attenuation observed by each client device. Feedback from a plurality of client devices can be used to recommend one or more channels and/or one or more channel widths of one or more operating bands to use that reduces latency, CCI, and/or ACI and improves speed, throughput, and/or QoS.

20 Claims, 8 Drawing Sheets

WIRELESS CHANNEL CONTROL USING CLIENT FEEDBACK

BACKGROUND

Wireless networking includes the use of various computing devices to access services, including voice, audio, and video data services, over a wireless network such as a local area network (LAN) of a home or business. A service provider, such as an internet service provider (ISP), typically supplies its customers with one or more pieces of customer premise equipment (CPE) for accessing internet service, via a wired network (e.g., hybrid fiber coaxial or fiber) which support wireless networks. For example, an ISP may provide a modem and a router or a single device that includes modem and router capabilities (referred to as a gateway) to its customers. When powered up and connected to the internet, a gateway can be used to provide radio frequency (RF) links or wireless channels for other radio-capable devices, such as smartphones, tablets, laptops, etc.

The Institute of Electrical and Electronics Engineers (IEEE) 802.11 standard defines protocols, procedures, and communication parameters to use for wireless networking. In addition to the communication of computer data, the IEEE 802.11 standard is being used for more and more for voice, audio, and video applications. IEEE 802.11 may include the consideration of Quality of Service (QOS) metrics to meet various QoS requirements including use of enhanced 802.11 media access control (MAC) protocols to support applications with QoS requirements.

A variety of wireless communication factors may affect QoS requirements, such as throughput and latency for example, experienced by client devices over a wireless network. Attenuation (e.g., physical structures) and/or interfering sources (e.g., cordless phones, wireless accessories, wireless cameras, other mobile devices, gateways, access points, routers, microwave emitters, etc.) may impact wireless signal quality experienced by each client device depending on where each client device is located. For example, Co-Channel Interference (CCI) and Adjacent Channel Interference (ACI) from other wireless devices (e.g., WIFI devices) in a wireless environment can result in poor network performance which may result in high retry rates and/or low throughput. Depending on amount of attenuation and interference seen at different locations in a wireless environment, a client device may have wireless performance of a certain quality (e.g., satisfactory or better) at one location but have a different quality (e.g., unsatisfactory) at a different location. Unfortunately, an access point, a router, gateway, etc. is unaware of the attenuation and/or interference parameters proximal to a location of each client device.

Some access points, routers, or gateways are configured include radio resource management (RRM) solutions that use automatic channel selection algorithms that attempt to select an operating channel that minimize interference from other wireless devices. However, the automatic channel selection algorithms do not account for radio frequency (RF) conditions proximal to a location of each particular client device. Accordingly, unsatisfactory performance may result when a gateway or access point has utilized a wireless channel for a client device that may not be the best channel for a particular location or communication environment. For example, the gateway may utilize a wireless channel and channel width based on its proximal RF environment that may be quite different from the RF environment proximal to the client device. A technical solution is needed to overcome the technical problem associated with use of a wireless channel and/or channel width of an operating band that results in unsatisfactory wireless performance.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure improve wireless networking performance by reducing or limiting performance issues caused by undetected or unknown interference sources and/or attenuation sources. According to an aspect, feedback from client devices can be utilized to reduce or limit wireless network performance issues caused by varying interference parameters and/or attenuation parameters observed by each client device. For example, feedback associated with wireless networking parameters observed by a client device may be received and analyzed as the client device moves from one location to a different location but remains associated with the same access point. Feedback, associated with wireless communication conditions of corresponding client devices, may be used in conjunction with a machine learning algorithm to enable a dynamic selection of one or more particular operating bands, channels, and/or channel widths to avoid or limit signal interference and/or signal attenuation observed by each client device but not necessarily observed by an access point, router, gateway, etc. For example, feedback may be received from a plurality of client devices associated with the same wireless network or different wireless networks and used to determine and recommend one or more channels and/or one or more channel widths of one or more operating bands to use that reduces latency, CCI, and/or ACI and improves speed, throughput, and/or QoS.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Aspects of the present disclosure improve wireless networking performance by reducing or limiting performance issues caused by undetected or unknown interference sources and/or attenuation sources. According to an aspect, feedback from client devices can be utilized to reduce or limit wireless network performance issues caused by varying interference parameters and/or attenuation parameters observed by each client device. For example, feedback associated with wireless networking parameters observed by a client device may be received and analyzed as the client device moves from one location to a different location but remains associated with the same access point. Feedback, associated with wireless communication conditions of corresponding client devices, may be used in conjunction with a machine learning algorithm to enable a dynamic selection of one or more particular operating bands, channels, and/or channel widths to avoid or limit signal interference and/or signal attenuation observed by each client device but not necessarily observed by an access point, router, gateway, etc. For example, feedback may be received from a plurality of client devices associated with the same wireless network or different wireless networks and used to determine and recommend one or more channels and/or one or more channel widths of one or more operating bands to use that reduces latency, CCI, and/or ACI and improves speed, throughput, and/or QoS.

Figure 1:
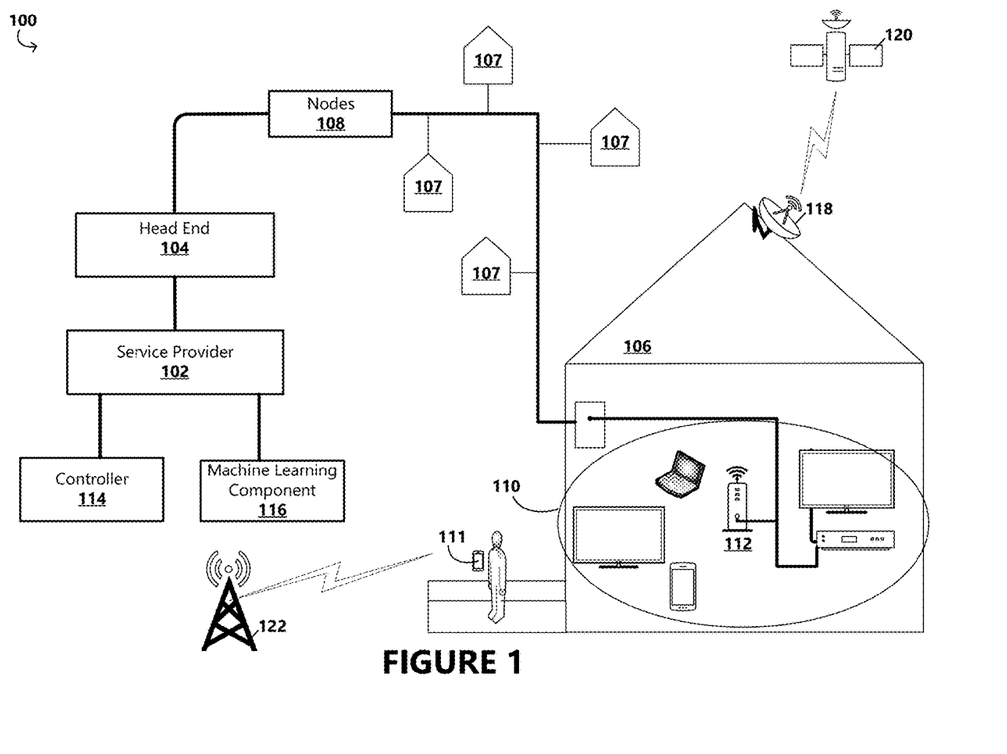
FIG. 1 is a block diagram of an example communication environment in which aspects of the present disclosure can be implemented.

FIG. 1 is a block diagram of an example communication environment 100 in which aspects of the present disclosure can be implemented. As shown in FIG. 1, example environment 100 includes a service provider 102 that utilizes various delivery equipment to provide video, internet, telephony, and/or other services to end-users. For example, service provider 102 can utilize headend 104 or other infrastructure to provide internet, live video, video conferencing, and other services to premises 106 (e.g., residential, business, etc.) and neighboring premises 107 via one or more network nodes 108. In some cases, a subscriber may have an installed antenna at premises 106 which is configured to link with backend equipment as part of accessing and using services of service provider 102. Service provider 102 may provide access to the internet and other services via satellite dish 118, satellite(s) 120, and/or cellular network 122. Premises 106 may include different types and numbers of end-user equipment 110 for use by end-users, such as set-top boxes, modems, routers, single device modems/routers (also referred to as gateways), internet of things, smart televisions, smartphones, laptop computers, desktop computers, tablet computers, etc.

Premises 106 may have been constructed so that different areas inside and outside have different amounts of attenuation and/or interference. For example, an access point or gateway 112 located in a media room surrounded by walls may observe lesser amounts of interference from outside sources, such as access points of neighboring premises 107. When outside of the media room, the surrounding walls no longer attenuate the foreign signals and therefore if a client device 111 was moved outside, it may observe more severe amounts of interference from outside sources as compared to RF conditions proximal to the gateway 112 located inside premises 106.

One type of user equipment 110 is referred to as a client device 111 or station which may conform to the IEEE 802.11 standard for associating with and connecting to gateway 112 or access point located at premises 106. Client device 111, such as a smartphone, laptop, tablet, etc. may observe different levels of interference when located inside premises 106 as compared to being outside of premises 106. Likewise, depending on the attenuation sources of premises 106, client device 111 may observe different levels of interference in certain rooms or areas of premises 106 as compared to other rooms or areas of premises 106. Potential external interference sources include gateways or access points of neighboring premises 107.

As described below, a system of one aspect is configured to utilize feedback provided by client device 111, and other client devices, as part of determining one or more operating bands, channels and/or channel widths to use when client device 111 is located at different locations of premises 106. For example, the system can be configured to recommend a first channel and channel width when client device 111 is located at a first location (e.g., a media room) and a second channel and channel width when client device 111 is located at a second location (e.g., back deck). Due to feedback from each client device, the system has knowledge of a wireless environment proximal to a location of each client device reporting feedback. Due to attenuating and/or interfering sources, the feedback from a particular client may suggest that using an operating band, a channel, and/or a channel width at one location may not be an optimal channel and/or channel width to use at a different location of premises 106.

With continuing reference to FIG. 1, and as an example, service provider 102 may utilize a network via a hybrid fiber coax (HFC) or fiber communication infrastructure to provide cable television, internet, and/or other services (referred collectively as services) to end-users via a junction at premises 106 that may include one or more filters, amplifiers, splitters, coaxial, fiber, etc. enabling signals to be communicated to and from premises 106 to access services provided by service provider 102. Service provider 102 may provide services via the communication infrastructure to a junction at premises 106 according to a standardized communication protocol. The standardized communication protocol according to which service provider 102 operates may define upstream and downstream channels to enable bidirectional communications between service provider 102 and a plurality of end-users.

As one non-limiting example, a cable modem termination system (CMTS) located at headend 104 may provide services, including internet and cloud services, to consumer premise equipment (CPE) (e.g., combined modem/router devices) located at premises 106 over a hybrid fiber-coaxial (HFC) network, where CPE then further communicates services to client devices used about premises 106. A data over cable service interface specification (DOCSIS) standard may be utilized for exchanging data between the CMTS and the CPE. As another non-limiting example, an optical line terminal (OLT) located at headend 104 may provide the services, including broadband internet access, to the CPE located on premises 106 over a passive optical network (PON). A PON standard may be utilized for exchanging data between the OLT and the CPE.

The CPE may include at least one combined modem/router device 112 (also referred to as gateway 112, see for e.g., Cox® Panoramic WIFI Gateway). Gateway 112 may receive data signals transmitted from headend 104 (e.g., from the CMTS or OLT), translate the signals such that the signals are interpretable by end-user equipment 110. Gateway 112 may form a local area network (e.g., an IEEE 802.11 network) to provide translated signals to client devices that are connected to the gateway 112. In some examples, CPE may further include one or more additional devices or accessories, such as range extenders, that may extend a range of the data signals output and input to gateway 112.

Gateway 112 may be associated with one or more SSIDs identifying one or more respective networks formed by gateway 112, including a first network (e.g., SSID1/password1) over which services of the service provider 102 can be provided. Each SSID may be associated with a unique password that is used to authorize client devices to connect to a wireless network. For the first network formed by gateway 112 over which services are provided, a first SSID (SSID1) identifies the first network and a first password (password1) is used to enable devices to connect to and utilize the first network. Once the correct password is submitted, devices may be referred to as connected devices with respect to gateway 112.

To connect with gateway 112 according to IEEE 802.11, as part of active scanning, client device 111 (also referred to as a mobile station) may collect beacon transmissions, send probe requests, etc. to discover 802.11 networks. A probe request typically includes supported data rates and 802.11 capabilities of client device 111. Gateways or access points within range of the probe request send a probe response to client device 111 with a service set identifier (SSID) or wireless network name, supported data rates, encryption type(s), and/or other 802.11 capabilities. Client device 111 can then select a compatible network based on received probe responses and gateway 112 utilizes a particular band and wireless channel with client device 111 which is now associated with and connected to gateway 112.

Signals from headend 104 are received and translated at gateway 112 for transmission to connected devices over the first network. Resultantly, connected devices may access services, including a channel selection service, provided by service provider 102 over the first network. As described, further below, service provider 102 includes at least one controller device 114 (also referred to as controller 114) in communication with headend 104 and to receive feedback via gateway 112 in regards to wireless networking conditions of connected devices. Depending on load and other factors, controller 114 can be included with headend 104, one or more nodes 108, an antenna location, etc. While a single controller 114 is depicted in FIG. 1, additional controllers may be strategically located to manage multiple locations using the channel selection service of service provider 102. According to one aspect, a dedicated server machine includes controller 114 which is configured as a wireless network controller to manage aspects of one or more wireless networks including operating bands, channels, channel widths, data rates, etc., In some examples, all or certain functionalities of controller 114 may be included in gateway 112, client devices, or another networking component.

Depending on a customer base of service provider 102, several access points, routers, or gateways may communicate with controller 114 so that controller 114 is aware of feedback provided from a plurality of client devices (for example feedback from client devices and/or gateways, access points, etc. operating at premises 106 and/or neighbor premises 107). Each client device may utilize IEEE 802.11 protocols to transmit feedback to gateway 112 or another device that corresponds to wireless network conditions observed proximal to a location of each client device. According to an aspect, a client device may transmit feedback to gateway 112 according to the IEEE 802.11 standard, such as a management frame (e.g., an active probe, an association request, etc.). The feedback from each client device can include a number of wireless networking parameters such as observed SSIDs, an airtime utilization parameter, a retry rate parameter, a latency parameter, a throughput parameter, a received signal strength (RSSI) parameter, a signal to noise ratio (SNR) parameter, etc. In one aspect, client device 111 can be configured to provide feedback to gateway 112 pertaining to a preferred band, channel, and/or channel width to use for association or reassociation based on observed RF conditions seen by client device 111 (e.g., from at least one radio interface).

An airtime utilization parameter may be quantified as a percentage of time that WIFI traffic is being used over the air from 0 to 100 percent (e.g., greater than a certain percentage (e.g., 60%) being unsatisfactory). A retry rate parameter may be quantified as a frame error rate that corresponds to frames that are not acknowledged due to error, corruption, etc. and need to be resent. A latency parameter may be quantified as an amount of time that a client device has to wait for a transmit opportunity. A throughput parameter may be quantified as an amount of data transmitted and received over a wireless network or the observed downlink and/or uplink data rates. While a certain number and type of feedback parameters are described herein, fewer or greater numbers and types may be used.

According to an aspect, feedback can be collected by each client device and transmitted to gateway 112 according to a number of different triggering factors. For example, feedback may be transmitted from client device 111 to gateway 112 or another device upon certain triggering events such as: when client device 111 attempts to associate or reassociate, when client device 111 moves to a new location while connected, when an application or device functionality of client device 111 degrades or becomes non-functional, when client device 111 launches an application, after a defined period of time, when a feedback parameter exceeds or falls below a defined threshold, etc.

According to one aspect, an application can be installed on client device 111 and used to monitor a wireless interface, such as one or more radios, a radio subsystem, etc. of client device 111 to gather parameters associated with wireless network conditions observed proximal to a location of client device 111. The application can be configured to automatically transmit feedback associated with the wireless network conditions observed proximal to a location of each client device. Feedback collection and conveyance from the application may be provided as part of a background task to minimize impact on device functionality. If the feedback results in an operating band, channel, and/or channel width adjustment, client device 111 uses the operating band, channel, and/or channel width adjustment for subsequent communication with gateway 112 until subsequent feedback from client device 111 results in a subsequent operating band, channel, and/or channel width adjustment.

According to an aspect, the application may be used to override an adjustment and request a different channel and/or channel width adjustment. The application may also be used to adjust weighting of feedback parameters and whether one or more parameters are to be ignored or observed. In such one example, an application includes software that is executable to enable a client device to monitor wireless networking parameters, transmit feedback back to a gateway or cloud network periodically or upon a trigger event, receive channel and/or channel width recommendations, tune to a new channel and/or channel width, etc.

With continuing reference to the example environment 100 of FIG. 1, service provider 102 includes one or more server machines and supporting communication infrastructure communicatively coupled to headend 104, one or more gateways or access points, client devices, etc. According to an aspect, service provider 102 utilizes a machine learning component 116 as part of analyzing client feedback and dynamically and adaptively determining one or more operating bands, channels, and/or channel widths to use in order to provide a high QoS wireless network to client devices that are connected to the wireless network. For example, machine learning component 116 can include a machine learning algorithm configured to adaptively and/or dynamically output a ranked list of recommended channels and/or channel widths for each radio based on historical feedback received from client devices as client devices are added to and removed from wireless networks.

According to an aspect, machine learning component 116 may be configured with a machine learning algorithm trained on one or more server machines of service provider 102 using various types of input data including current, past, and projected network operating conditions, device locations, device types, data usage by type of device or application, throughput values, latency values, airtime utilization values, retry rate values, operational characteristics and/or configurations of each device, interference conditions, attenuation conditions, and/or other device and/or signal behaviors to optimize one or more of operating band, channel, and/or channel width selections. For example, machine learning component 116, based on historical client feedback, can execute the machine learning algorithm to determine a first channel and/or channel width for a first client device at a first location connected to a first wireless network and a second channel and/or channel width for a second client device connected to a second wireless network based in part on feedback parameters from each device that quantify signal quality affected by attenuation and/or interference sources at each of the first location and the second location.

As another example, machine learning component 116 may utilize the machine learning algorithm that includes a variety of weighted feedback or signal quality parameters to determine best channels and/or channel widths for client devices receiving services from service provider 102. For example, service provider 102 can use machine learning component 116 to determine optimal channels and/or channel widths for groups of customers, wherein each group is defined based on potential interference and contention issues with nearest neighbors or according to a defined radiation patterning. Machine learning component 116 can use the client feedback with the machine learning algorithm to provide a quality experience to as many clients as possible by ensuring that one or more throughput values, latency values, airtime utilization values, retry rate values, RSSI values, SNR values, etc. are within acceptable ranges.

According to one aspect, machine learning component 116 can execute the machine learning algorithm to rank channels as a priority ranking for use by gateway 112 and connected client devices using client feedback and feedback from gateway 112. For example, certain client devices and/or application types may have priority over other client devices and/or application types, and the machine learning algorithm may be weighted to use a best channel and channel width for the priority client devices and/or application types. As described above, a user may use an installed application to accept, override, and/or adjust recommended channel and/or channel widths output by machine learning component 116. The various machine learning parameters, weights, inputs, outputs, etc. may be stored and deleted as a wireless network evolves and changes.

In some examples, machine learning component 116 uses one or more unsupervised machine learning techniques (e.g., self-organizing maps, nearest-neighbor mapping, k-means clustering and singular value decomposition) to explore a dataset/datasets (e.g., historical data) for identifying and learning patterns for channel selection and optimization. In some examples, machine learning component 116 may use one or a combination of other machine learning techniques (e.g., supervised machine learning, semi-supervised machine learning, reinforcement learning, etc.) for generating a machine-learned model or channel selection algorithm.

Figure 2:
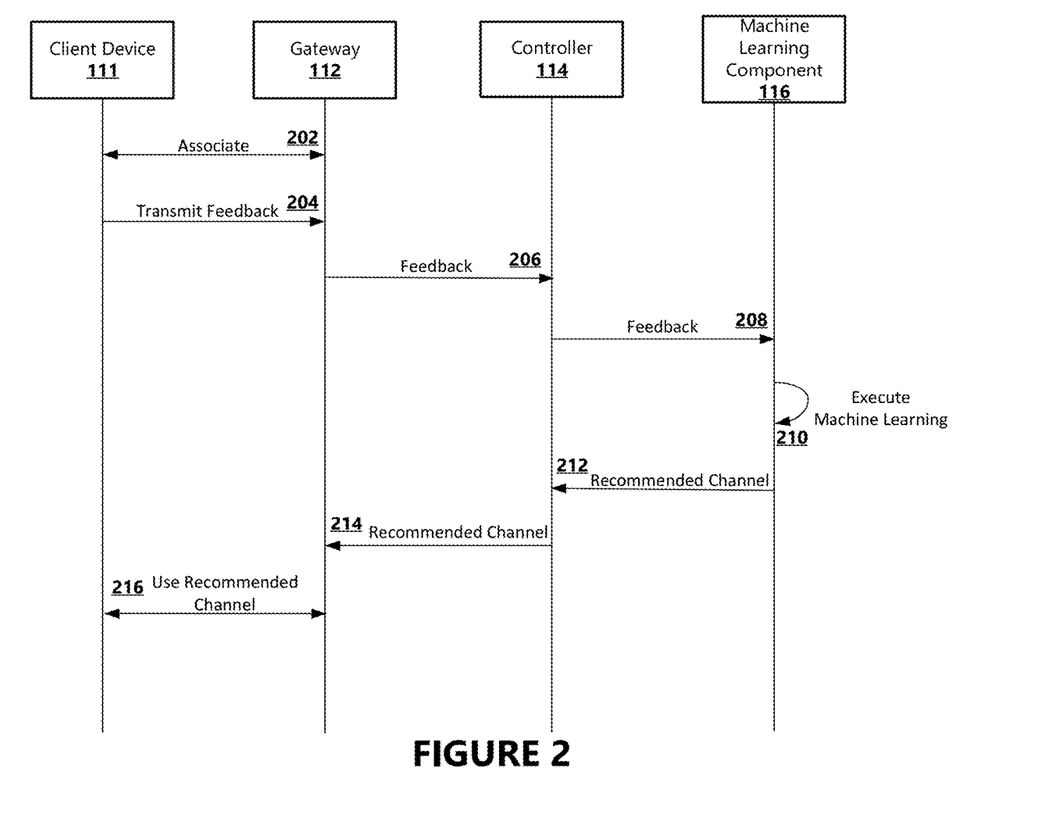
FIG. 2 is a high-level communication diagram of a channel selection service according to an aspect.

FIG. 2 is a high-level communication diagram of a channel selection service provided by service provider 102 according to an aspect. At 202, client device 111 associates with gateway 112. For example, after receiving a beacon or probe response from gateway 112, client device 111 can associate with and connect to gateway 112 using an operating band, channel, and channel width configured by gateway 112. At 204, client device 111 transmits feedback associated with wireless networking conditions observed by client device 111 at its location. For example, client device 111 may perform a scan at 204 to detect other routers, gateways, or access points that are within radio range of client device 111 based on the current location using one or more SSID scans and transmit the results of the SSID scan(s) to gateway 112 that includes all available SSIDs for each scanned channel observed by client device 111.

In one aspect, at 204, client device 111 can be configured to transmit additional wireless network parameters to gateway 112, such as an airtime utilization parameter associated with each channel, a retry rate parameter associated with each channel, a throughput parameter associated with each channel, and/or a latency parameter associated with each channel. At 206, gateway 112 provides the feedback received from client device 111 to controller 114. According to an aspect, at 206, gateway 112 provides its own operational feedback along with feedback provided by connected devices to controller 114. At 208, controller 114 provides the feedback to machine learning component 116.

At 210, machine learning component 116 executes a machine learning algorithm using the feedback to determine at least one recommended operating band, channel, and/or channel width for use with client device 111. At 212, machine learning component 116 provides the recommended operating band, channel, and/or channel width to controller 114. At 214, controller 114 provides the recommended operating band, channel, and/or channel width to gateway 112. At 216, gateway 112 advertises the recommended operating band, channel, and/or channel width to associate with, connect to, or reconnect with client device 111. In some aspects, functionality of controller 114 can be included with gateway 112 so gateway 112 provides feedback to machine learning component 116 at 206 and receives the recommended operating band, channel, and/or channel width from machine learning component 116 at 212.

Figure 3:
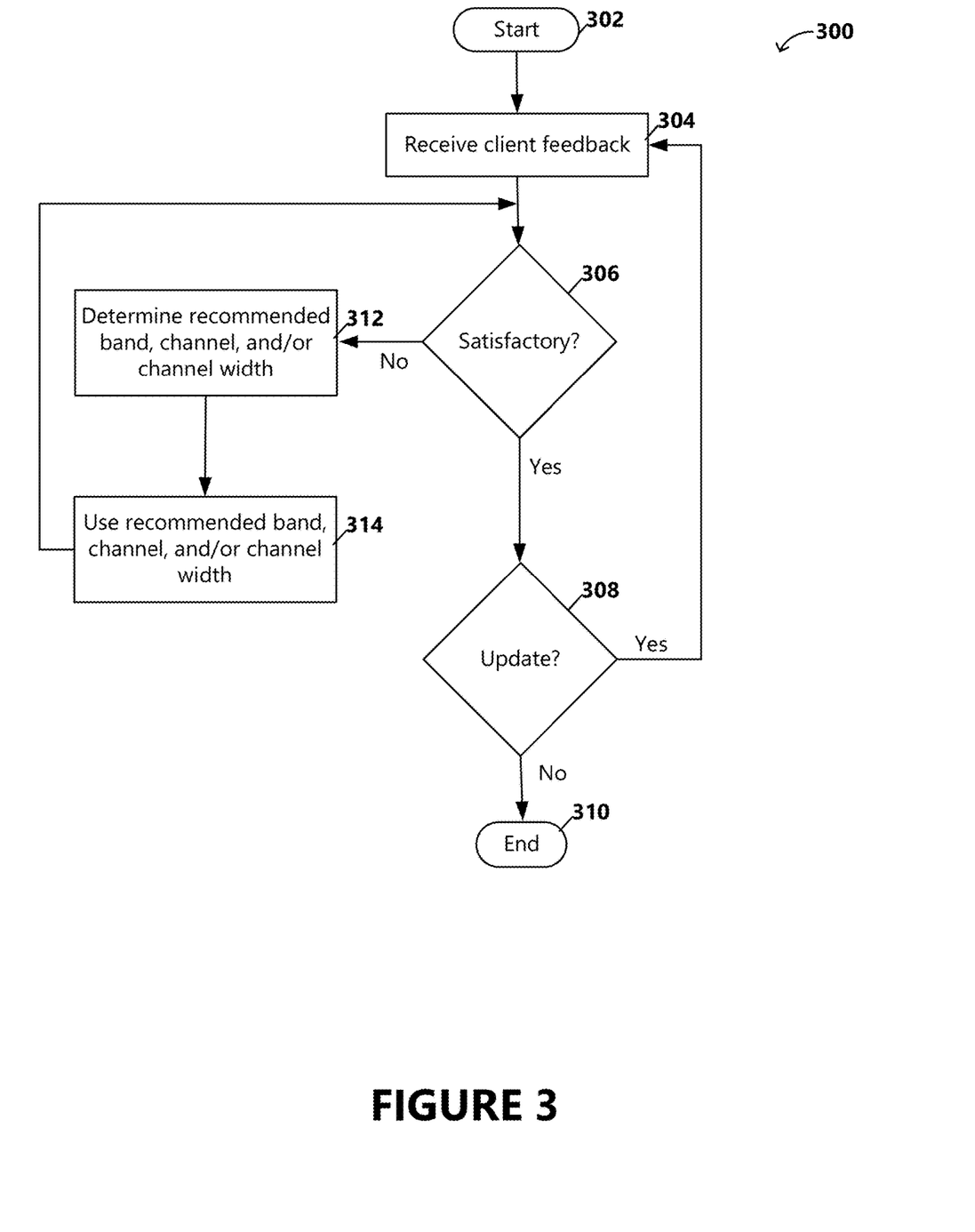
FIG. 3 is a flow diagram depicting an exemplary method of configuring at least one operating band, channel, and/or channel width to use with a client device and gateway according to an aspect.

FIG. 3 is a flow diagram depicting an exemplary method 300 of configuring at least one operating band, channel, and/or channel width to use using feedback from at least from client device 111 based on operational conditions of a wireless network observed by client device 111 proximal to its location according to an aspect. While method 300 describes receiving feedback from client device 111, method 300 is configured to receive feedback from multiple client devices, gateways, access points, etc. as part of determining operating bands, channels, and/or channel widths to use with respect to the multiple client devices. Method 300 begins at 302 and proceeds to 304 and receives feedback from client device 111, wherein the feedback corresponds to operational conditions associated with a channel and channel width that client device 111 is currently operating on. For example, method 300 may rely on gateway 112 to receive feedback from client device 111 or rely on a cellular network channel if there is no WIFI available.

In some instances, feedback may be provided by client device 111 using an information element according to IEEE 802.11 in conjunction with a management frame or other frame type transmitted by client device 111 to gateway 112. For example, a "0" value of an information element conveys satisfactory operational conditions or quality, whereas a "1" value of the information element conveys unsatisfactory operational conditions or quality. Method 300 of one aspect uses the channel selection service to control channel and/or channel width changes using a variety of operational parameters from client devices such as observed SSIDs for each scanned channel, airtime utilization associated with a channel, retry rate associated with a channel, throughput associated with a channel, latency associated with a channel, RSSI, SNR, etc. Feedback may be provided from client device 111 and/or gateway 112 on a scheduled basis and/or according to a trigger event such as: after changing channels, moving to a different location, when airtime utilization exceeds a threshold value, when retry rate exceeds a threshold value, when throughput falls below a threshold value, when latency exceeds a threshold value, etc.

At 306, method 300 determines, based on the feedback, that operational conditions of the wireless network proximal to client device 111 are satisfactory. For example, satisfactory operational conditions exist when: an information element value representing operational quality is "0", an airtime utilization value is below a defined threshold, a throughput value is equal to or above a defined threshold, a latency value is below a defined threshold, a retry rate value is below a defined threshold, etc. If the operational conditions of the wireless network are satisfactory at 306, method 300 proceeds to 308 and determines if updated feedback has been or is being received from client device 111. If updated feedback is received from client device 111 at 308, method 300 returns to 304. If there is no updated feedback from client device 111 at 308, method 300 ends at 310.

If the operational conditions of the wireless network are unsatisfactory at 306, method 300 proceeds to 312 and uses the feedback associated with the operational conditions of the wireless network proximal to client device 111 to determine and recommend an operating band, channel, and/or channel width to use for subsequent wireless communications for client device 111. For example, unsatisfactory operational conditions exist when: an information element value representing operational quality is "1", an airtime utilization value is equal to or above a defined threshold, a throughput value is below a defined threshold, a latency value is equal to or above a defined threshold, a retry rate value is equal to or above a defined threshold, etc. In some cases, client device 111, gateway 112, controller 114, machine learning component 116, or some other component can be configured to determine an operating band, channel, and/or channel width to use for subsequent wireless communications when operating conditions are unsatisfactory.

In one aspect, client device 111 can use an installed channel selection application to automatically inform gateway 112 to change operating bands, channels, and/or channel widths for subsequent communications when operational conditions of the wireless network proximal to client device 111 are unsatisfactory. In some aspects, determination of satisfactory or unsatisfactory operational conditions of the wireless network may be determined by client device 111, gateway 112, controller 114, machine learning component 116, or some other component.

At 314, method 300 uses the recommended channel and/or channel width of the operating band for subsequent wireless communications with client device 111. For example, controller 114 can receive recommended channel output from machine learning component 116 and then provide the recommended channel output to gateway 112 for advertising to client device 111 the channel and/or channel width of the operating band for subsequent wireless communications. In some cases, a recommended channel is a recommendation to stay on a current channel until further notice. After implementing the recommended channel and/or channel width of the operating band at 314, method 300 returns to 306 and again determines if operational conditions of the wireless network are satisfactory using the recommended channel and/or channel width of the operating band.

Figure 4:
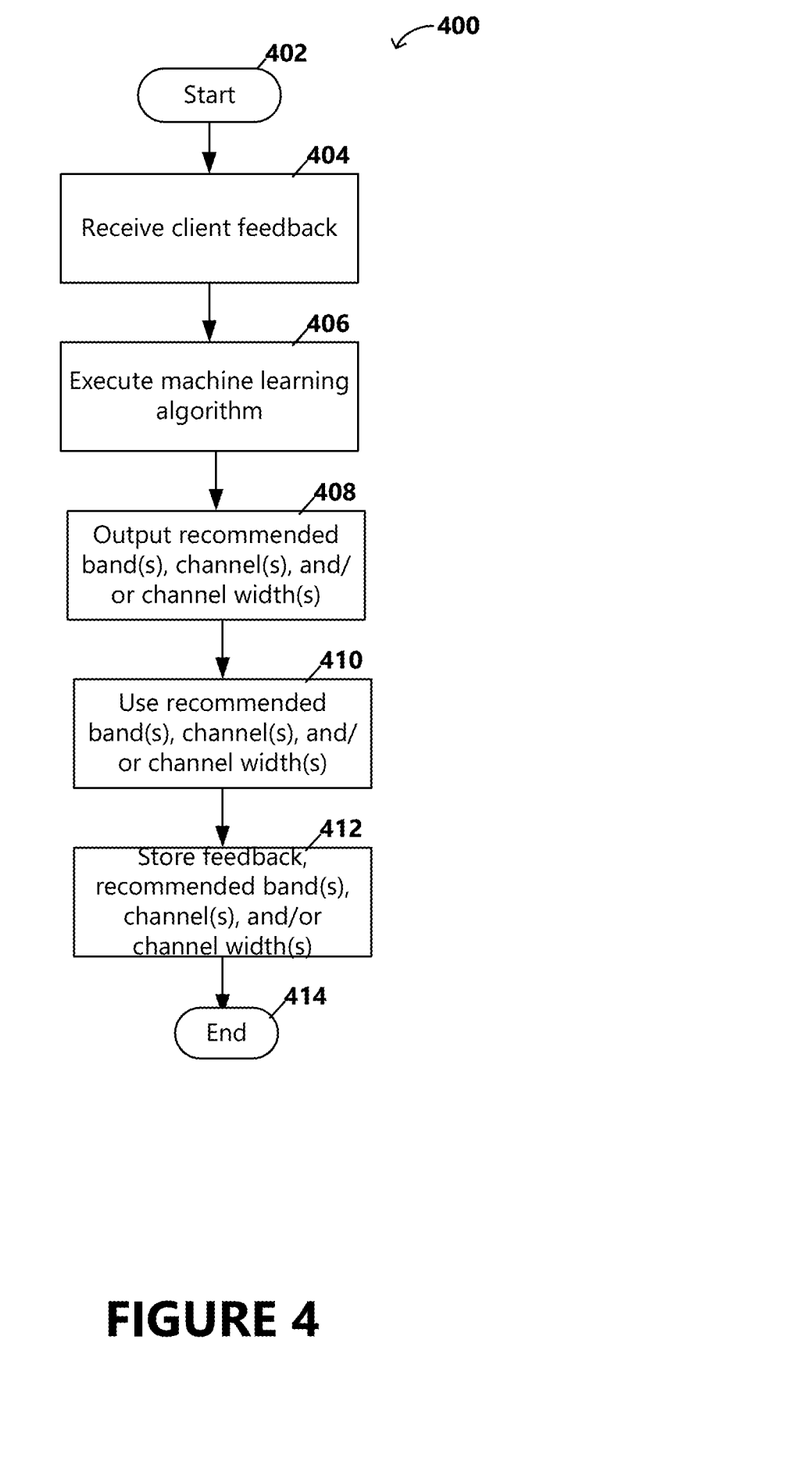
FIG. 4 is a flow diagram depicting an exemplary method of using machine learning to determine one or more recommended channels and/or channel widths to use according to an aspect.

FIG. 4 is a flow diagram depicting an exemplary method 400 of using machine learning to determine one or more recommended channels and/or channel widths to use with one or more gateways, routers, or access points, and a plurality of client devices according to an aspect. Method 400 begins at 402 and proceeds to 404 and receives feedback from one or more of the plurality of client devices, wherein the feedback is associated with operational conditions of a wireless network proximal to a corresponding client device. For example, multiple gateways may receive feedback from multiple client devices which may be provided to controller 114 (or multiple controllers associated with service provider 102) when controller 114 manages the multiple gateways of customers.

At 406, method 400 provides aggregated feedback associated with operational conditions of different wireless networks used by all or a subset of the plurality of client devices to machine learning component 116. At 408, method 400 uses machine learning component 116 to execute a machine learning algorithm to determine a recommended operating band, channel, and/or channel width for each client device according to the aggregated feedback. For example, machine learning component 116 can execute the machine learning algorithm using weighted wireless condition feedback parameters such as observed SSIDs, airtime utilization values, retry rate values, throughput values, latency values, RSSI values, SNR values, etc. to recommend one or more of an operating band, channel, or channel width for each client device.

At 410, method 400 provides the recommended operating band, channel, and/or channel width for each client device output from machine learning component 116 to controller 114 for distribution to corresponding gateways serving respective client devices. At 412, method 400 stores the feedback, recommended operating bands, channels, and/or channel widths based on one or more locations and/or on a per gateway or client device basis in computer readable storage, such as a database or other data structure before exiting at 414. For example, method 400 may store feedback from client devices, access points, gateways, etc. such as previously used operating bands, channels, and/or channel widths with operational parameters, recommended operating bands, channels, and/or channel widths with operational parameters, etc. for each location using a cloud network (e.g., a datacenter), a server machine, a controller device, gateway, etc. As with client feedback, feedback associated with access points or gateways can include similar operational parameters or some subset or superset depending on the particular channel selection service being implemented. It will be appreciated that method 400 may utilize multiple controllers, machine learning components, databases, etc. depending on the architecture of the wireless environment.

Figure 5:
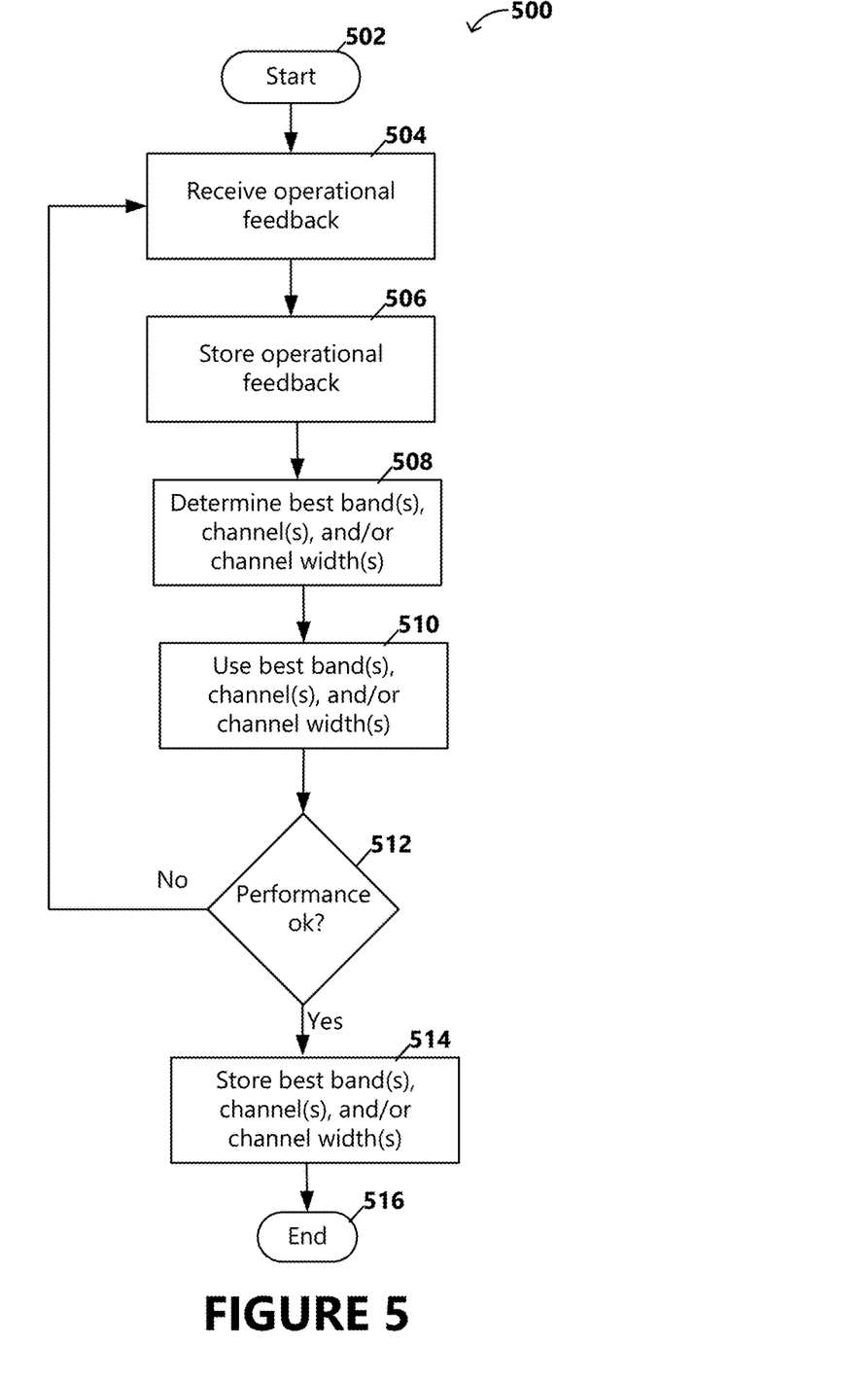
FIG. 5 is a flow diagram depicting an exemplary method of using a channel selection service to control operational conditions of multiple wireless networks according to an aspect.

FIG. 5 is a flow diagram depicting an exemplary method 500 of using a channel selection service to control operational conditions of multiple wireless networks according to an aspect. The method 500 of one aspect is configured to control operational conditions of multiple wireless networks to reduce or limit an amount of CCI and/or an amount of ACI using machine learning to output recommended operational parameters such as operating bands, channels, channel widths, data rates, and/or other communication parameters. For example, as client devices move away from gateways or access points to different locations having different attenuation and interference values, some or all of the client devices may observe reduced signal quality due to large amounts of CCI or ACI that results in unsatisfactory airtime utilization (e.g., greater than 40 percent) and unpredictable performance from collisions.

Method 500 begins at 502 and proceeds to 504 where method 500 receives feedback associated with other gateways, routers, access points, or other potential interference sources that are detected by each client device after performing an SSID scan. In one aspect, in addition to use if an SSID scan, method 500 can use an application to gather operational feedback by monitoring operational conditions of each client device for each channel in use, such as airtime utilization values, retry rate values, throughput values, latency values, etc. Feedback from client devices may be transmitted to a common controller, cloud network, service provider server machine(s), etc. for storage and machine learning.

At 506, method 500 stores the feedback associated with all or a subset of client devices in computer storage. For example, method 500 can store feedback of client devices delineated by each gateway, router, or access point in a storage device. At 508, method 500 uses machine learning and feedback to predict and select best operating bands, channels, and/or channel bandwidths for wireless communications. For example, method 500 can use machine learning and historical data to identify best operating bands, channels, and/or channel bandwidths of the IEEE 802.11 standard to reduce CCI and/or ACI associated with neighboring households or businesses. At 510, method 500 implements the best operating bands, channels, and/or channel bandwidths for wireless communications. If method 500 determines that network performance is equal to or above a defined threshold at 512, method 500 stores the best operating bands, channels, and/or channel bandwidths in computer readable storage and exits at 516. If method 500 determines that network performance is below the defined threshold at 512, method 500 returns to 504.

Depending on radio capabilities of client devices, gateways, routers, access points, etc., different operating bands, channels, and/or channel bandwidths can be selected per client. For example, different client devices can use different channels of certain operating bands (e.g. 2.4 GHZ, 5 GHZ, 6 GHZ, etc.) depending upon radio capabilities and historical and/or real-time interference assessments. Method 500 can be configured to analyze all or some subset of the SSIDs of its customers in addition to operational feedback to control which operating bands, channels, and/or channel widths are being used by which client devices to maximize the QoS for the customers of service provider 102. As described above, the channel selection service may be integrated into the functionality of a router, access point, gateway, controller, server machine, etc. It will be appreciated that method 500 may utilize multiple controllers, machine learning components, computer storage devices, etc. depending on the architecture of a wireless environment.

An example use of method 500 to recommend a channel and channel bandwidth of an operating band for use by a gateway, router, access point, etc. when at least one wireless client (e.g., IEEE 802.11 clients) and a gateway, router, access point, etc. observe different RF conditions follows. By using client feedback concerning its proximal RF conditions, method 500 can prevent the gateway, router, access point, etc. from configuring one or more radios (e.g., channels, channel widths, data rates, etc.) that result in poor client performance. Method 500 may also be used when internet service is provided to premises 106 using a mounted dish antenna that connects to an access point of service provider 102. An Ethernet cable connects the antenna to a power adapter which is connected to the gateway, router, access point, etc. of premises 106.

For this example, client device 111 used an installed spectrum analysis application to measure RF conditions proximal to gateway 112 at a first location within premises 106 and measure RF conditions proximal to client device 111 at a second location outside of premises 106. Gateway 112 was positioned in a room surrounded by wooden and plaster walls. When client device 111 was positioned near the location of gateway 112, output of the spectrum analysis application revealed that the construction of the interior of premises 106 provided a high level of attenuation which suppressed wireless signals originating outside of premises 106 from reaching gateway 112.

When client device 111 was located outside of premises 106, without the benefit of the interior construction, output of the spectrum analysis application revealed exposure to large amounts of RF interference from access points located at neighboring premises 107. As a result, and before execution of method 500, client device 111 realized unsatisfactory wireless conditions even when a radio of client device 111 was receiving a strong signal. The unsatisfactory wireless conditions included stalled connectivity (~15 seconds or more) with client device 111 dropping the connection and reverting to its cellular interface.

Figure 6A:
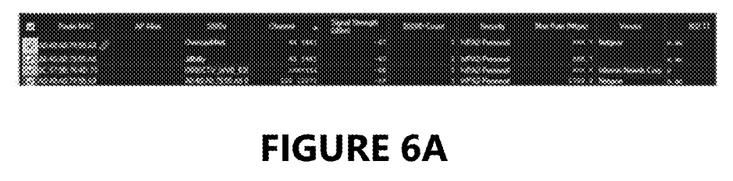
FIGS. 6A and 6B depict example spectral outputs associated with a wireless environment.
Figure 6B:
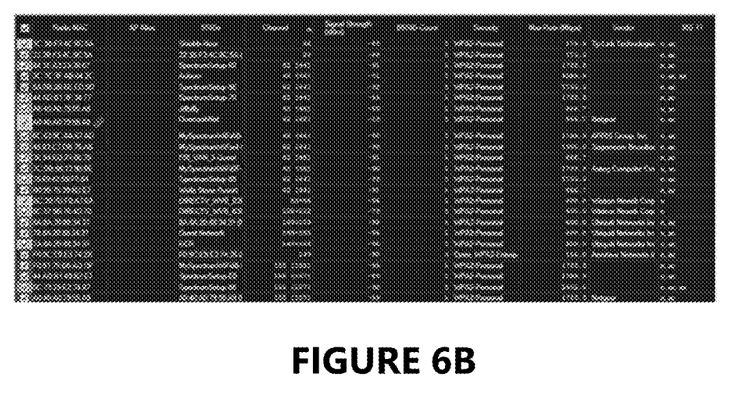

Continuing with this example, the spectrum analysis application operated as a spectrum analyzer using channelization software to analyze congestion and interference issues associated with different operating bands (e.g., 2.4 GHZ, 5 GHZ, 6 GHZ, etc.). Four SSIDs (see FIG. 6A) were observed proximal to the location of gateway 112, with 3 radiating from within premises 106 (e.g., private SSID, guest SSID, and a hidden satellite extender SSID). As shown in FIG. 6B, the number of SSIDs observed by client device increased dramatically when outside premises 106. Channel 42 is being used by a large number of devices creating large amounts of CCI and channel 52+56 are creating ACI since client device 111 was on channel 42. Conventionally, and before executing method 500, since gateway 112 is not aware of the RF conditions of radios of client device 111, the gateway's radio resource management (RRM) algorithm selected channel 42 and an 80 MHz channel width, causing client device 111 to experience severe bandwidth contention due to the contending access points within range. After using method 500, machine learning component 116 has provided output based on the client feedback for gateway 112 to use a less congested channel X of operating band Y with a channel width of less than 80 MHz.

Figure 7:
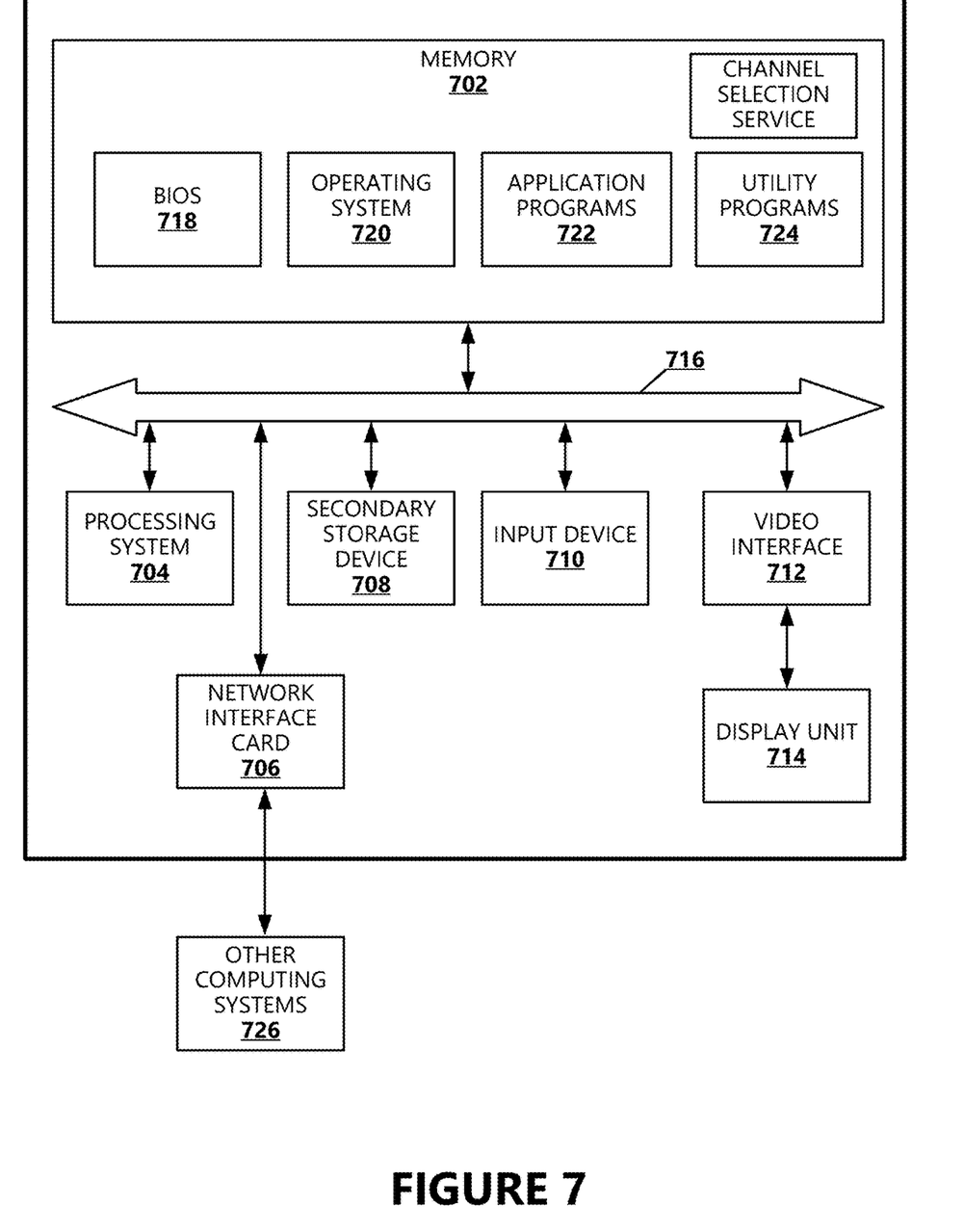
FIG. 7 is a block diagram illustrating example physical components of a computing device or system with which embodiments can be practiced.

FIG. 7 is a block diagram illustrating example physical components of a computing device 700 or system with which embodiments may be practiced as part of providing a wireless networking channel selection service. It should be appreciated that in other embodiments, different hardware components other than those illustrated in the example of FIG. 7 may be used. Computing devices may be implemented in different ways in different embodiments. For instance, in the example of FIG. 7, the computing device 700 includes a processing system 704, memory 702, a network interface card 706 (wired and/or wireless, cellular type, 802.11 type, etc.), a secondary storage device 708, an input device 710, a video interface 712, a display unit 714, and a communications medium 716. In other embodiments, the computing device 700 may be implemented using more or fewer hardware components (e.g., a video interface, a display unit, or an input device) or in combination with other types of computer systems and applications 726.

The memory 702 includes one or more computer-readable storage media capable of storing data and/or computer-executable instructions. Memory 702 may store the computer-executable instructions that, when executed by a processor of the processing system 704, provide an application that is configured to collect operational parameters and provide the collected operational parameters as feedback to other devices. In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, applications, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., cellular, WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 or program code that, when executed by the processing system 704, cause the computing device 700 to provide applications (e.g., application 128) to users including a channel selection application operable to send feedback to the cloud or other devices. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPOE), etc. including any combination thereof.

Figure 8A:
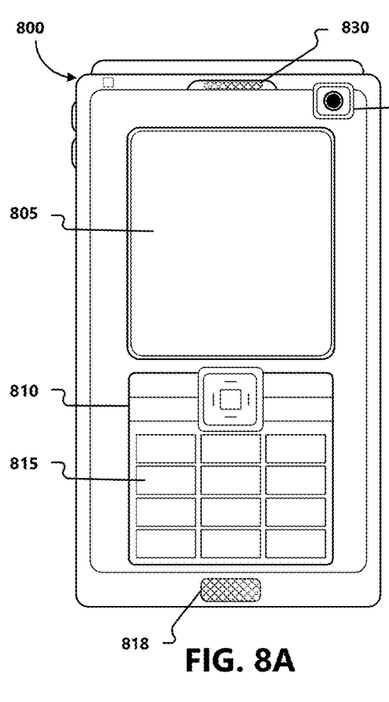
FIGS. 8A and 8B are block diagrams illustrating example physical components of a suitable mobile computing environment with which aspects of the present disclosure can be practiced.
Figure 8B:
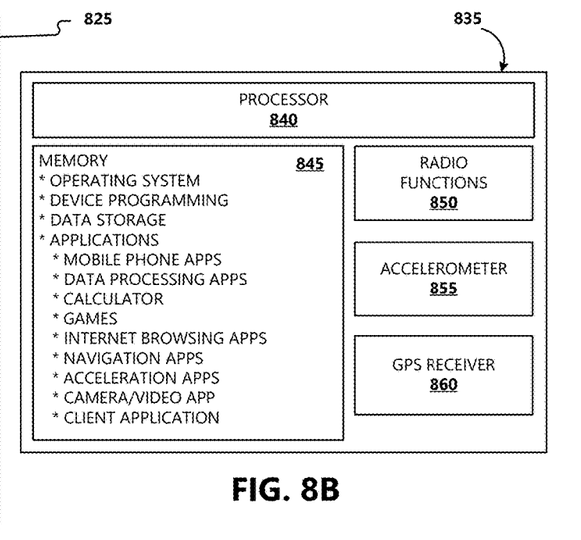

FIGS. 8A-8B illustrate a suitable mobile computing device 800 or environment, for example, a mobile computing device or smartphone, a tablet personal computer, a laptop computer, or other end device 108, with which aspects can be practiced. The mobile computing device 800 is illustrative of any suitable device operative to send, receive and process wireless communications, as well as run applications (e.g., application 126 for collecting operational parameters and sending feedback to other devices). A display screen 805 is operative for displaying a variety of information such as information about incoming and outgoing communications, as well as, a variety of data and displayable objects, for example, text, alphanumeric data, photographs, and the like.

Data input to the mobile computing device 800 can be performed via a variety of suitable means, such as, touch screen input via the display screen 805, keyboard or keypad input via a data entry area 810, key input via one or more selectable buttons or controls 815, voice input via a microphone 818 disposed on the mobile computing device 800, photographic input via a camera 825 functionality associated with the mobile computing device 800, or any other suitable input means. Data can be output via the mobile computing device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 can be utilized for storing a device operating system, device programming, one or more stored applications, for example, mobile telephone applications, data processing applications, operational collected and feedback applications, channel selection applications, calculators, games, Internet browsing applications, navigation applications, acceleration applications, camera and/or video applications, client applications etc.

Mobile computing device 800 can contain an accelerometer 855 for detecting acceleration, and can be used to sense orientation, vibration, and/or shock. Mobile computing device 800 can contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the mobile computing device 800 to communicate with other communication devices and systems via one or more wireless networks (e.g., cellular, WIFI, BLUETOOTH, etc.). Radio functions 850 can be utilized to communicate with a wireless or WIFI-based positioning system to determine a device location.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system comprising:
    a controller device; and
    a gateway device configured to provide wireless channels to a client device, wherein the gateway device is further configured to:
        receive, from at least one client device, feedback associated with one or more wireless communication conditions observed by the client device at a location upon detection of a trigger event wherein the trigger event comprises one of the following: changing channels, moving to a different location, when airtime utilization exceeds a first threshold value, when retry rate exceeds a second threshold value, when throughput falls below a third threshold value, when latency exceeds a fourth threshold value;
        transmit, to the controller device, the feedback received from the client device at the location;
        receive, from the controller device, a wireless channel recommendation and a channel width recommendation from machine learning according to the feedback for use by the client device at the location for wireless communications; and
        use the wireless channel recommendation and the channel width recommendation for the wireless communications with the client device at the location, wherein the client device is configured to override and adjust at least one of the wireless channel recommendation and the channel width recommendation.

2. The system of claim 1, wherein the controller device includes a machine learning algorithm to determine the wireless channel recommendation for wireless communications with the client device.

3. The system of claim 2, wherein the controller device is further configured to recommend a wireless channel in use as the wireless channel recommendation.

4. The system of claim 2, wherein the controller device is further configured to recommend a different channel or channel width of a same band or a different band as the wireless channel recommendation.

5. The system of claim 1, wherein the controller device and the gateway device are integrated into a single device.

6. The system of claim 1, further comprising a server machine that comprises the controller device.

7. The system of claim 6, wherein the server machine includes a machine learning algorithm configured to determine the wireless channel recommendation based in part on the feedback received from the client device.

8. The system of claim 7, wherein the controller device is further configured to:
    receive information that includes operational and/or configuration parameters of one or more of the client device, the gateway, one or more different gateways, and one or more different client devices;
    apply a machine learning algorithm to the received information; and
    automatically implement the wireless channel recommendation based on the received information.

9. The system of claim 8, wherein the controller device uses the machine learning algorithm to determine the wireless channel recommendation based on wireless condition parameters that include at least on one of a service set identifier (SSID) parameter, an airtime utilization parameter, a retry rate parameter, a throughput parameter, and a latency parameter associated with the wireless channel at the location of the client device.

10. The system of claim 1, wherein at least one of the client device, the gateway device, or the controller device is configured to weight one or more of the wireless condition parameters for machine learning.

11. The system of claim 1, wherein the client device is further configured to override the wireless channel recommendation.

12. A method comprising:
    receiving, by a gateway from a client device, feedback associated with one or more wireless communication conditions observed by the client device at a location upon detection of a trigger event, wherein the gateway is configured to provide wireless channels to the client device wherein the trigger event comprises one of the following: changing channels, moving to a different location, when airtime utilization exceeds a first threshold value, when retry rate exceeds a second threshold value, when throughput falls below a third threshold value, when latency exceeds a fourth threshold value;
    transmitting, by the gateway to a controller device, the feedback from the client device at the location;
    receiving, by the gateway from the controller device, a wireless channel recommendation and a channel width recommendation based on machine learning according to the feedback for use by the client device for wireless communications; and
    using the wireless channel recommendation and the channel width recommendation for the wireless communications with the client device, wherein the client device is configured to override and adjust at least one of the wireless channel recommendation and the channel width recommendation.

13. The method of claim 12, further comprising using a machine learning algorithm to determine the wireless channel recommendation for the wireless communications with the client device.

14. The method of claim 12, further comprising:
    receiving a recommendation to remain on a wireless channel in use as the wireless channel recommendation; or
    receiving a recommendation to use a different channel or channel width of a same band or a different band as the wireless channel recommendation.

15. The method of claim 12, further comprising:
    receiving information including operational and/or configuration parameters of one or more of the client device, the gateway, one or more different gateways, and one or more different client devices;
    applying a machine learning algorithm to the received information; and
    automatically implementing the wireless channel recommendation based on the received information.

16. The method of claim 15, further comprising using the machine learning algorithm to determine the wireless channel recommendation based on wireless condition parameters that include at least on one of a service set identifier (SSID) parameter, an airtime utilization parameter, a retry rate parameter, a throughput parameter, and a latency parameter.

17. The method of claim 15, further comprising using the machine learning algorithm to determine a wireless channel recommendation for a different location of the client device based on feedback from the client device at the different location.

18. A non-transitory computer readable medium that includes executable instructions which, when executed:
    receive, from a client device, feedback associated with one or more wireless communication conditions observed by the client device at a location upon detection of a trigger event wherein the trigger event comprises one of the following: changing channels, moving to a different location, when airtime utilization exceeds a first threshold value, when retry rate exceeds a second threshold value, when throughput falls below a third threshold value, when latency exceeds a fourth threshold value;

transmit, to a controller device, the feedback from the client device at the location;

receive, from the controller device, a wireless channel recommendation and a channel width recommendation based on machine learning according to the feedback for use by the client device for wireless communications; and use the wireless channel recommendation and the channel width recommendation for the wireless communications with the client device, wherein the client device is configured to override and adjust at least one of the wireless channel recommendation and the channel width recommendation.

19. The non-transitory computer readable medium of claim 18, wherein the executable instructions which, when executed, further execute a machine learning algorithm to determine the wireless channel recommendation based on wireless condition parameters that include at least on one of a service set identifier (SSID), an airtime utilization parameter, a retry rate parameter, a throughput parameter, and a latency parameter.

20. The non-transitory computer readable medium of claim 19, wherein the executable instructions which, when executed, further use the machine learning algorithm to determine a wireless channel recommendation for a different location of the client device based on feedback from the client device at the different location.

* * * * *